United States Patent
Lee

(10) Patent No.: US 12,202,404 B2
(45) Date of Patent: Jan. 21, 2025

(54) VIRTUAL SOUND OUTPUT SYSTEM FOR COMMUNICATION WITH PEDESTRIAN AND CONTROL METHOD THEREOF

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 82 days.

(21) Appl. No.: 18/347,097

(22) Filed: Jul. 5, 2023

(65) Prior Publication Data
US 2024/0010124 A1  Jan. 11, 2024

(30) Foreign Application Priority Data
Jul. 5, 2022  (KR) .......................... 10-2022-0082540

(51) Int. Cl.
*B60Q 5/00* (2006.01)
*G01S 15/42* (2006.01)

(52) U.S. Cl.
CPC .............. *B60Q 5/006* (2013.01); *B60Q 5/00* (2013.01); *G01S 15/42* (2013.01)

(58) Field of Classification Search
CPC ........... B60Q 5/00; B60Q 5/006; G01S 15/42; G08B 3/10; G08C 23/02; H04R 1/02; H04R 1/028; H04R 1/40; H04R 3/00; H04R 3/12
See application file for complete search history.

(56) References Cited

U.S. PATENT DOCUMENTS

| | | | | |
|---|---|---|---|---|
| 2017/0120803 A1* | 5/2017 | Kentley | .................... | B60Q 1/26 |
| 2019/0121601 A1* | 4/2019 | Li | .............................. | H04N 5/04 |
| 2019/0124446 A1* | 4/2019 | Pan | ....................... | H04R 29/002 |

FOREIGN PATENT DOCUMENTS

KR  20190002984 A  1/2019

* cited by examiner

*Primary Examiner* — Van T Trieu
(74) *Attorney, Agent, or Firm* — Novo TechIP International PLLC

(57) ABSTRACT

Provided are a virtual sound output system for communication with pedestrians and a control method thereof, and in particular, to a virtual sound output system for communication with pedestrians and a control method thereof, which enable smooth transmission of sound to one or a plurality of pedestrian groups by differentially controlling focal points according to pedestrian distribution situations, while performing communication between a vehicle and a pedestrian using a beam-focused directional speaker.

10 Claims, 4 Drawing Sheets

VIRTUAL SOUND OUTPUT SYSTEM FOR COMMUNICATION WITH PEDESTRIAN AND CONTROL METHOD THEREOF

CROSS-REFERENCE TO RELATED APPLICATIONS

This application claims priority under 35 U.S.C. § 119 to Korean Patent Application No. 10-2022-0082540, filed on Jul. 5, 2022, in the Korean Intellectual Property Office, the present invention of which is incorporated herein by reference in its entirety.

TECHNICAL FIELD

The following present invention relates to a virtual sound output system for communication with pedestrians and a control method thereof, and in particular, to a virtual sound output system for communication with pedestrians and a control method thereof, which enable smooth transmission of sound to one or a plurality of pedestrian groups by differentially controlling focal points according to pedestrian distribution situations, while performing communication between a vehicle and a pedestrian using a beam-focused directional speaker.

BACKGROUND

Autonomous vehicles refer to vehicles that may operate on their own without a driver or passenger operation. The concept of autonomous driving was proposed by Mercedes in the 1960s, and autonomous vehicles recognize a driving environment using a sensor, determine a driving route, and control a controller, such as an engine, chassis, and the like.

Autonomous driving technology uses functions, such as speed maintenance, adaptive speed maintenance, lane maintenance, and lane change according to a driving situation, and provides convenience to drivers in a stable driving environment, such as a highway.

If the autonomous driving functions are advanced and operate even in the city with environments, such as intersections and the like, interaction with pedestrians should also be considered. In order to simulate a non-verbal communication process between a pedestrian and a driver, communication lighting technology as shown in FIG. 1 has been introduced.

In this method, an autonomous vehicle recognizes a pedestrian and irradiates a road surface with light to indicate that the vehicle will wait for the pedestrian to cross the road, thereby performing communication.

The communication lighting method using lighting technology may be less effective depending on external lighting conditions and may not be understood by pedestrians because it is a non-verbal display.

In order to reinforce the communication effect of communication lighting, a method of outputting a guide sound by installing an external speaker has been proposed.

General speakers transmit sound in all directions, which worsens the environmental noise level, so directional speakers are used. However, the directional speaker may accurately transmit sound in a corresponding direction in the case of a single pedestrian, but in the case of multiple pedestrians, it may be difficult for a pedestrian out of the range of a beam angle to perceive a guide sound.

Therefore, when a large number of pedestrians cross at a crosswalk or the like, a communication effect through the guide sound to all pedestrians is inevitably lowered.

SUMMARY

An embodiment of the present invention is directed to providing a virtual sound output system for communication with pedestrians and a control method thereof, which enable smooth transmission of sound to one or a plurality of pedestrian groups by differently controlling focal points according to pedestrian distribution situations, while performing communication between a vehicle and a pedestrian using a beam-focused directional speaker.

In one general aspect, a virtual sound output system for communication with a pedestrian includes: a beam-focused directional speaker emitting ultrasonic waves to a focal point at a specific position and including a plurality of ultrasonic transducers; and a controller calculating the focal point based on a received position of the pedestrian and controlling driving of the beam-focused directional speaker so that ultrasonic waves are emitted to the calculated focal point, wherein the controller controls the driving of the beam-focused directional speaker to emit ultrasonic waves with a time difference for each of the plurality of ultrasonic transducers so that the ultrasonic waves emitted from the plurality of ultrasonic transducers reach the focal point simultaneously.

When it is determined that there is only one pedestrian based on the received position of the pedestrian, the controller may calculate the position of the focal point according to a setting within a predetermined range from the received position of the pedestrian.

When it is determined that there are two or more pedestrians based on the received position of the pedestrian, the controller may calculate positions of left and right outermost pedestrians, among the corresponding pedestrians, in a forward direction of the plurality of ultrasonic transducers and positions of left and right outermost ultrasonic transducers, among the plurality of ultrasonic transducers, and calculate, as a focal point, an intersection between a straight line between the calculated position of the left outermost pedestrian and the calculated position of the right outermost ultrasonic transducer and a straight line between the calculated position of the right outermost pedestrian and the calculated position of the left outermost ultrasonic transducer.

When the positions of the left and right outermost pedestrians are respectively $(x_l, z_l)$ and $(x_r, z_r)$, and the positions of the left and right outermost ultrasonic transducers are respectively $(x_a, 0)$ and $(-x_a, 0)$, $(x, y)$, the position of the intersection, may be calculated through the following equation.

$$\begin{bmatrix} x \\ y \end{bmatrix} = \begin{bmatrix} \frac{-z_l x_a}{x_l - x_a} \\ \frac{z_r x_a}{x_r + x_a} \end{bmatrix} \cdot \begin{bmatrix} \frac{-z_l}{x_l - x_a} & 1 \\ \frac{-z_r}{x_r + x_a} & 1 \end{bmatrix}^{-1}$$

The controller may calculate a distance r between focal points and each of the ultrasonic transducers based on positions of the N ultrasonic transducers and the calculated position of the focal point, and calculate an emission delay time d of each ultrasonic transducer for ultrasonic waves emitted from the ultrasonic transducers to simultaneously reach the focal point, and control each ultrasonic transducer to emit ultrasonic waves.

When the position of the focal point is $(xf, yf, zf)$, the controller may calculate an emission delay time $di$ of an i-th ultrasonic transducer, among N ultrasonic transducers, through the following equation.

$$d_i = \frac{\max_{0 \le j \le N-1} r_j - r_i}{c}$$

(Here, c is a speed of ultrasonic waves (340 m/s) and $$r_i = \sqrt{(x_f-x_i)^2+(y_f-y_i)^2+(z_f-z_i)^2}.)$$

When a sound function to be transmitted to a pedestrian by controlling the beam-focused directional speaker is g(t), the controller may calculate p(t), an output signal function of the beam-focused directional speaker, through the following equation.

$$p(t)=P_0\sqrt{1+m\int\int g(t)dt^2}\cdot\sin 2\pi f_0 t$$

(Here, t is time, fo is the ultrasonic frequency, and Po and m are constants.)

The controller may calculate pi(t), an output signal function of the i-th ultrasonic transducer of an N number of the ultrasonic transducers, through the following equation.

$$p_i(t)=p(t-d_i)$$

In another general aspect, a control method of a virtual sound output system for communication with a pedestrian includes: a) determining, by the controller, whether there is one pedestrian or there are two or more pedestrians based on a received pedestrian position; b) when there is only one pedestrian in a), controlling the beam-focused directional speaker to emit ultrasonic waves using the position of the pedestrian as a focal point; and c) when there are two or more pedestrians in step a), controlling the beam-focused directional speaker to emit ultrasonic waves using the intersection as a focal point.

In b) or c) above, the controller may calculate a distance r between focal points and each of the ultrasonic transducers based on positions of the N number of the ultrasonic transducers and the calculated position of the focal point, calculate an emission delay time d of each ultrasonic transducer for ultrasonic waves emitted from the ultrasonic transducers to simultaneously reach the focal point, and control each ultrasonic transducer to emit ultrasonic waves based on the corresponding emission delay time.

Other features and aspects will be apparent from the following detailed description, the drawings, and the claims.

DETAILED DESCRIPTION

In order to describe the present invention, the operational advantages of the present invention, and the objects achieved by the practice of the present invention, embodiments of the present invention are described.

Terms used in the present application are used only to describe specific embodiments, and are not intended to limit the present invention. A singular form may include a plural form if there is no clearly opposite meaning in the context. It will be further understood that the terms "comprises" or "have" used in this specification, specify the presence of stated features, numerals, components, parts, or a combination thereof, but do not preclude the presence or addition of one or more other features, numerals, components, parts, or a combination thereof.

In describing the present invention, if it is determined that a detailed description of a related known configuration or function may obscure the gist of the present invention, the detailed description will be omitted.

Figure 1:
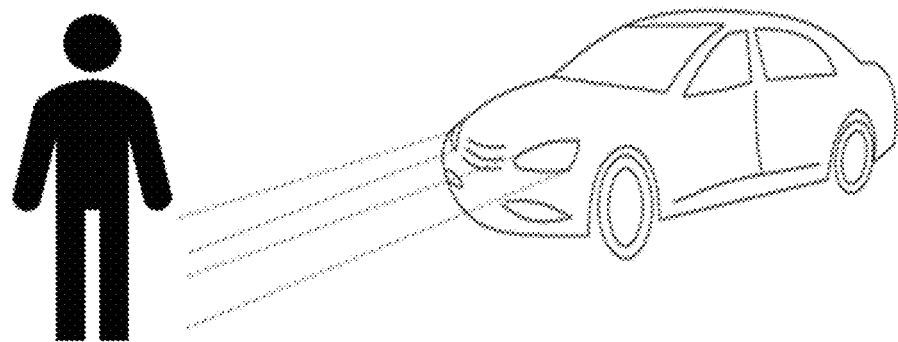
FIG. 1 is a diagram illustrating a state in which communication using lighting technology is performed between a conventional autonomous vehicle and a pedestrian.
Figure 2:
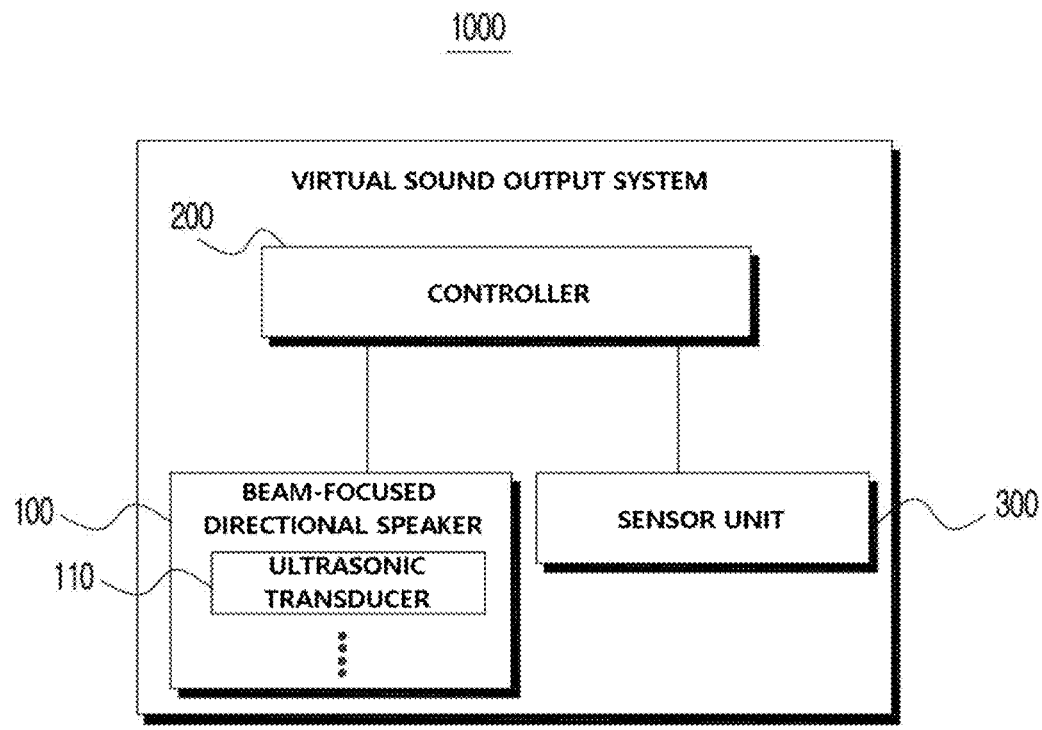
FIG. 2 is a block diagram illustrating an internal configuration of a virtual sound output system according to an embodiment of the present invention.
Figure 3:
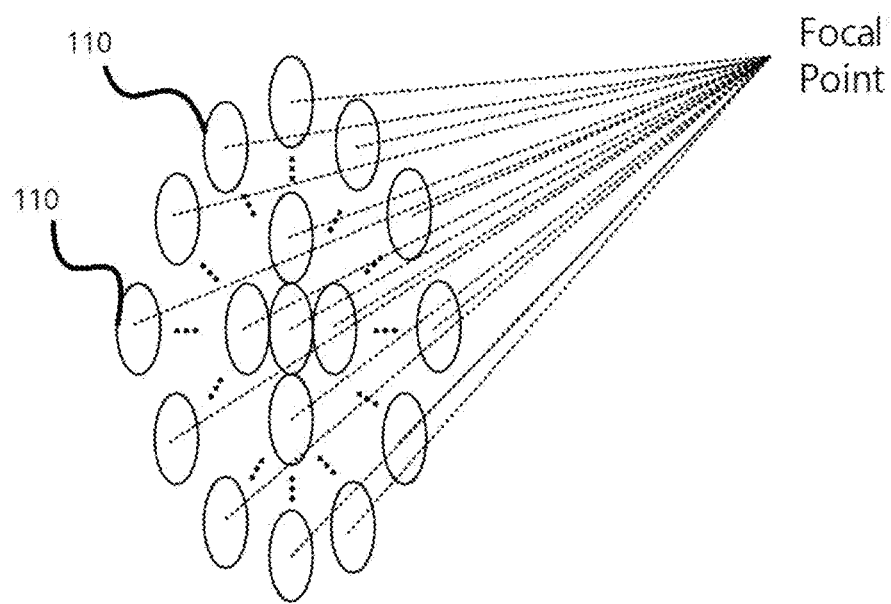
FIG. 3 is a view illustrating a state in which a beam-focused directional speaker emits ultrasonic waves to a focal point when there is only one pedestrian according to an embodiment of the present invention.

FIG. 2 is a block diagram illustrating an internal configuration of a virtual sound output system according to an embodiment of the present invention, and FIG. 3 is a view illustrating a state in which a beam-focused directional speaker emits ultrasonic waves to a focal point when there is only one pedestrian according to an embodiment of the present invention.

Referring to the drawings, a virtual sound output system 1000 according to an embodiment of the present invention includes a beam-focused directional speaker 100 emitting ultrasonic waves to a focal point F in a specific position and including a plurality of ultrasonic transducers 110 and a controller 200 calculating the focal point F based on a received position of a pedestrian and controlling driving of the beam-focused directional speaker 100 so that ultrasonic waves may be emitted to the calculated focal point F.

Here, as shown in FIG. 3, when the beam-focused directional speaker 100 emits ultrasonic waves to the corresponding focal point F, the ultrasonic waves may be converted into sound that may be heard by a pedestrian through a medium, such as air, during the emission process, thereby enabling communication.

As shown in FIG. 3, the beam-focused directional speaker 100 may include a plurality of ultrasonic transducers 110 arranged in an annular shape on one side of a front of a vehicle and may focus and output sound to a specific position with the plurality of ultrasonic transducers 110.

As shown in FIG. 3, the beam-focused directional speaker 100 is provided so that each ultrasonic transducer 110 emits ultrasonic waves to the focal point F. If there is only one pedestrian for the focal point F to communicate with, the controller 200 may specify the focal point F as a corresponding pedestrian position and control the beam-focused directional speaker 100 to emit ultrasonic waves to the corresponding position.

Meanwhile, the controller 200 is provided to communicate with a pedestrian through a sound output by controlling the aforementioned beam-focused directional speaker 100. The controller 200 may determine whether an object is a pedestrian and whether there is one pedestrian or a plurality of pedestrians through front object information received from the separate sensor unit 300, and if there is one pedestrian, the controller 200 may control the beam-focused directional speaker 100 to emit ultrasonic waves to the corresponding pedestrian position as a focal point as described above.

Figure 4:
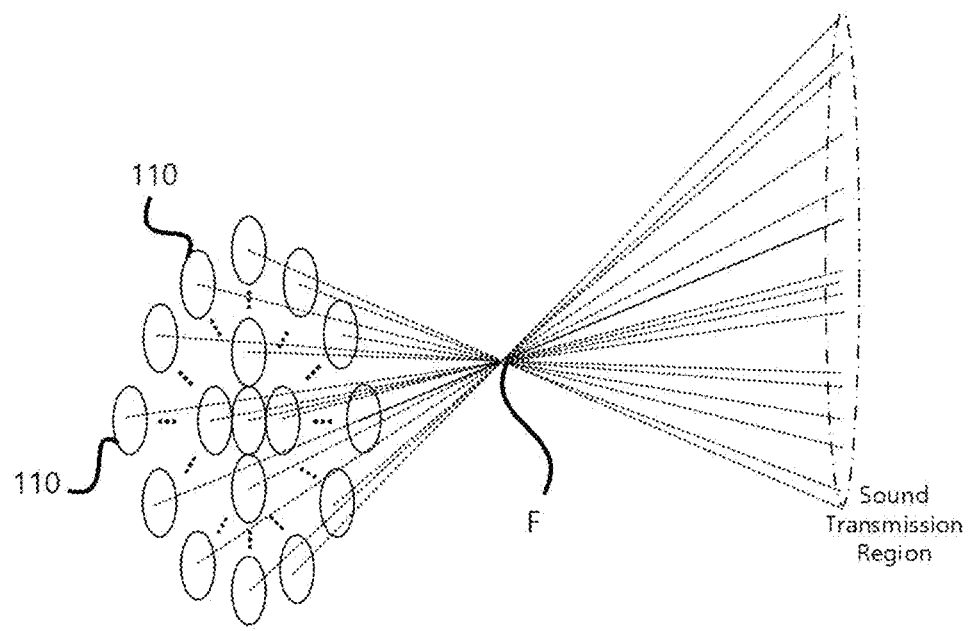
FIG. 4 is a diagram illustrating a state in which a beam-focused directional speaker emits ultrasonic waves to a focal point when there are two or more pedestrians according to an embodiment of the present invention.
Figure 5:
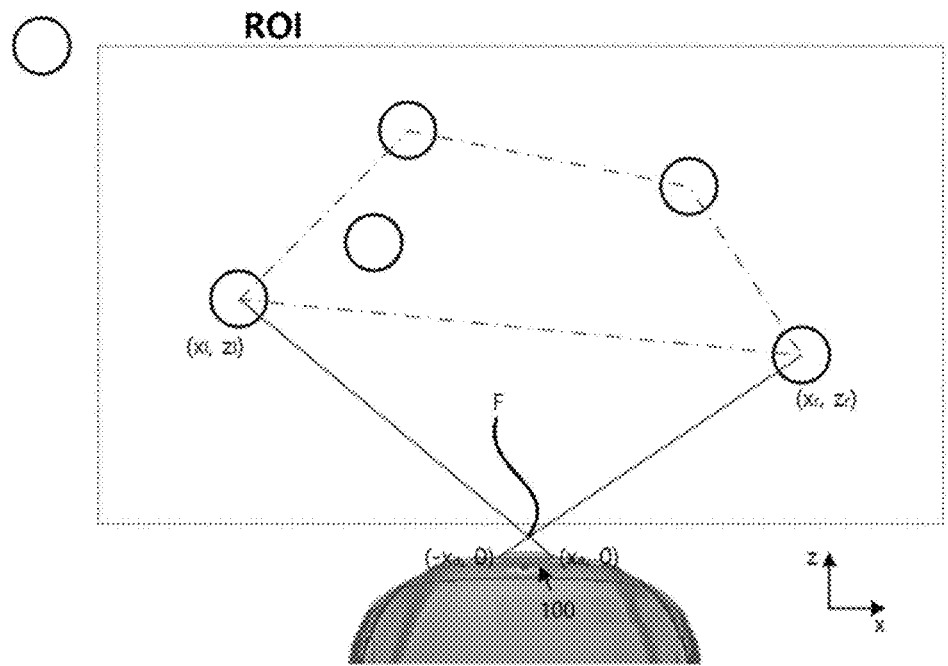
FIG. 5 is a diagram illustrating a principle of calculating a focal point by a controller in FIG. 4.

FIG. 4 is a diagram illustrating a state in which a beam-focused directional speaker emits ultrasonic waves to a focal point when there are two or more pedestrians according to an embodiment of the present invention, and FIG. 5 is a diagram illustrating a principle of calculating a focal point by a controller in FIG. 4.

Referring to the drawings, when two or more pedestrians are distributed in a cluster form, the beam-focused directional speaker 100 according to an embodiment of the present invention cannot output sound only to a specific pedestrian as in the embodiment described above, and thus, the focal point F is positioned to be closer to the beam-focused directional speaker 100 so that sound may be output to a region including all pedestrians as shown in FIGS. 4 and 5.

In the case of such a plurality of pedestrians, in order to calculate the focal point F, the controller 200 configures the beam-focused directional speaker 100 as shown in FIG. 5, extracts positions of left and right outermost pedestrians, among front pedestrians, based on the plurality of ultrasonic transducers 110 having an annular array, extracts positions of left and right outermost ultrasonic transducers 110, among the plurality of ultrasonic transducers 110, and calculates, as a focal point F, an intersection between a straight line between the position of the left outermost pedestrian and the position of the right outermost ultrasonic transducer and a straight line between the position of the right outermost pedestrian and the position of the left outermost ultrasonic transducer.

This may be obtained by formula as follows. When the positions of the left and right outermost pedestrians are respectively $(x_l, z_l)$ and $(x_r, z_r)$ and the positions of the left and right outermost ultrasonic transducers are respectively $(x_a, 0)$ and $(-x_a, 0)$, an equation of the straight line connecting the left and right sides of the ultrasonic transducers 110 and the pedestrians to intersect each other may be expressed by Equation (1) below.

$$\begin{bmatrix} \frac{-z_l}{x_l - x_a} & 1 \\ \frac{-z_r}{x_r + x_a} & 1 \end{bmatrix} \begin{bmatrix} x \\ y \end{bmatrix} = \begin{bmatrix} \frac{-z_l x_a}{x_l - x_a} \\ \frac{z_r x_a}{x_r + x_a} \end{bmatrix} \quad \text{Equation (1)}$$

Accordingly, the coordinates of the intersection may be obtained by multiplying both sides by an inverse matrix of the matrix on the left side, which may be expressed by the following equation (2).

$$\begin{bmatrix} x \\ y \end{bmatrix} = \begin{bmatrix} \frac{-z_l x_a}{x_l - x_a} \\ \frac{z_r x_a}{x_r + x_a} \end{bmatrix} \cdot \begin{bmatrix} \frac{-z_l}{x_l - x_a} & 1 \\ \frac{-z_r}{x_r + x_a} & 1 \end{bmatrix}^{-1} \quad \text{Equation (2)}$$

As such, in the present invention, when there are a plurality of pedestrians, the focal point may be adjusted so that the beam-focused directional speaker 100 may emit ultrasonic waves to a region including all of the pedestrians, and in order to adjust the focal point F, as described above, the controller 200 may accurately calculate the focal point through the positions of the pedestrians received from the sensor unit 300 and the positions of the ultrasonic transducers 110 constituting the beam-focused directional speaker 100, and accordingly, sound may be selectively output to one pedestrian or several pedestrians as necessary.

Figure 6:
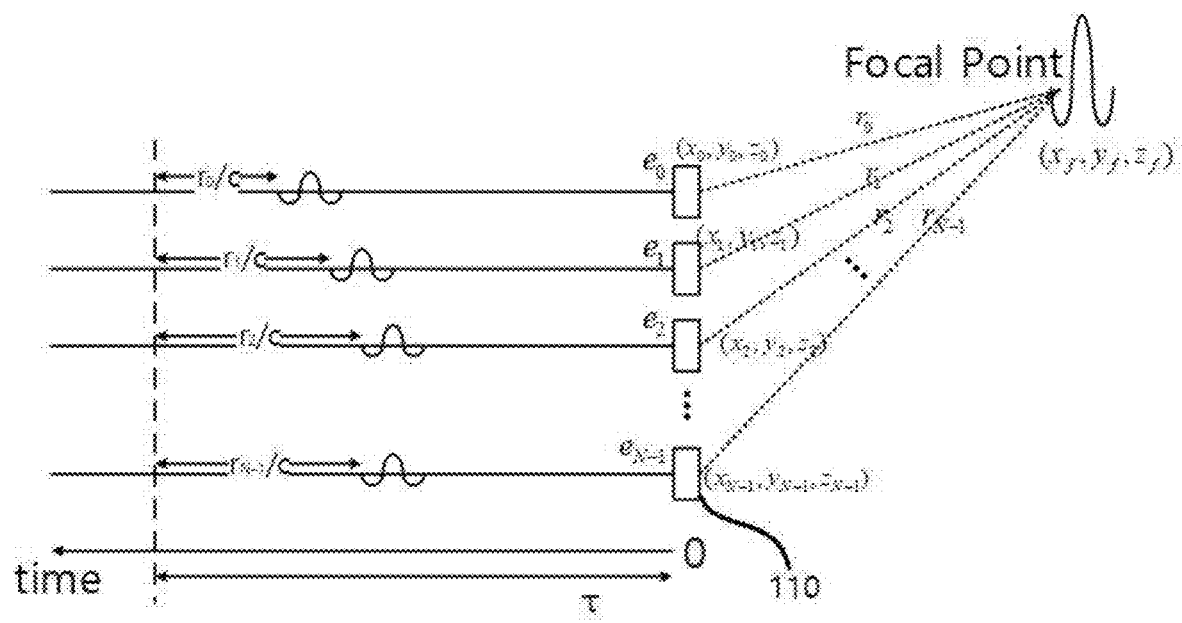
FIG. 6 is a diagram illustrating an emission time delay process for each ultrasonic transducer in a beam-focused directional speaker according to an embodiment of the present invention.

FIG. 6 is a diagram illustrating an emission time delay process for each ultrasonic transducer in a beam-focused directional speaker according to an embodiment of the present invention.

Referring to the drawing, as the beam-focused directional speaker 100 is formed in an annular array, when all ultrasonic transducers 110 simultaneously emit ultrasonic waves to the focal point F, distances between each of the ultrasonic transducers 110 and the focal point are different, so time to reach the focal point F is different from each other.

Therefore, the controller 200 according to the present invention may calculate a distance r between each of the ultrasonic transducers 110 and the focal point F based on the position of each of an N number of the ultrasonic transducers 110 and the position of the focal point F calculated through the method as in the embodiment described above, and calculate an emission delay time d for each of the ultrasonic transducers 110 for ultrasonic waves emitted from the ultrasonic transducers 110 to simultaneously reach the focal point F.

That is, the distance r between each of the ultrasonic transducers and the focal point is calculated through the positions of the ultrasonic transducers 110 and the calculated position of the focal point, and when the distance r is calculated, an arrival time to the focal point for each of the ultrasonic transducers 110 may be known.

When the arrival time difference of each of the ultrasonic transducers 110 is obtained, an emission time of each ultrasonic transducer that may simultaneously reach the focal point may be known based on the corresponding time difference.

In this manner, the controller 200 of the present invention performs the following calculation process to calculate the emission delay time d for each ultrasonic transducer 110. Referring to this, when the position of the focal point F is $(x_f, y_f, z_f)$, an emission delay time $d_i$ of an i-th ultrasonic transducer, among the N number of the ultrasonic transducers, may be calculated through Equation (3) below.

$$d_i = \frac{\max_{0 \le j \le N-1} r_j - r_i}{c} \quad \text{Equation (3)}$$

Here, c is the speed of ultrasonic waves (340 m/s), and ri may be calculated by Equation (4) below.

$$r_i = \sqrt{(x_f - x_i)^2 + (y_f - y_i)^2 + (z_f - z_i)^2} \quad \text{Equation (4)}$$

In this manner, when the emission delay time d is calculated for the emission ultrasonic waves of all the ultrasonic transducers 110 to simultaneously reach the focal point F, the controller 200 of the present invention transmits the calculated emission delay time d to the beam-focused directional speaker 110, so that the ultrasonic transducers 110 emit ultrasonic waves based on the corresponding emission delay time d.

In addition, in the present invention, an output signal function p(t) for the controller 200 to output as a target sound function g(t) using the beam-focused directional speaker 100 may be expressed by Equation (5) below.

$$p(t) = P_0 \sqrt{1 + m \int\!\!\int g(t) dt^2} \cdot \sin 2\pi f_0 t \quad \text{Equation (5)}$$

Here, t is time, fo is the ultrasonic frequency, and Po and m are constants.

In addition, in the controller, the output signal function p(t) of the i-th ultrasonic transducer 110, among the N number of ultrasonic transducers 110, may be expressed by Equation (6) below.

$$p_i(t) = p(t - d_i) \quad \text{Equation (6)}$$

Figure 7:
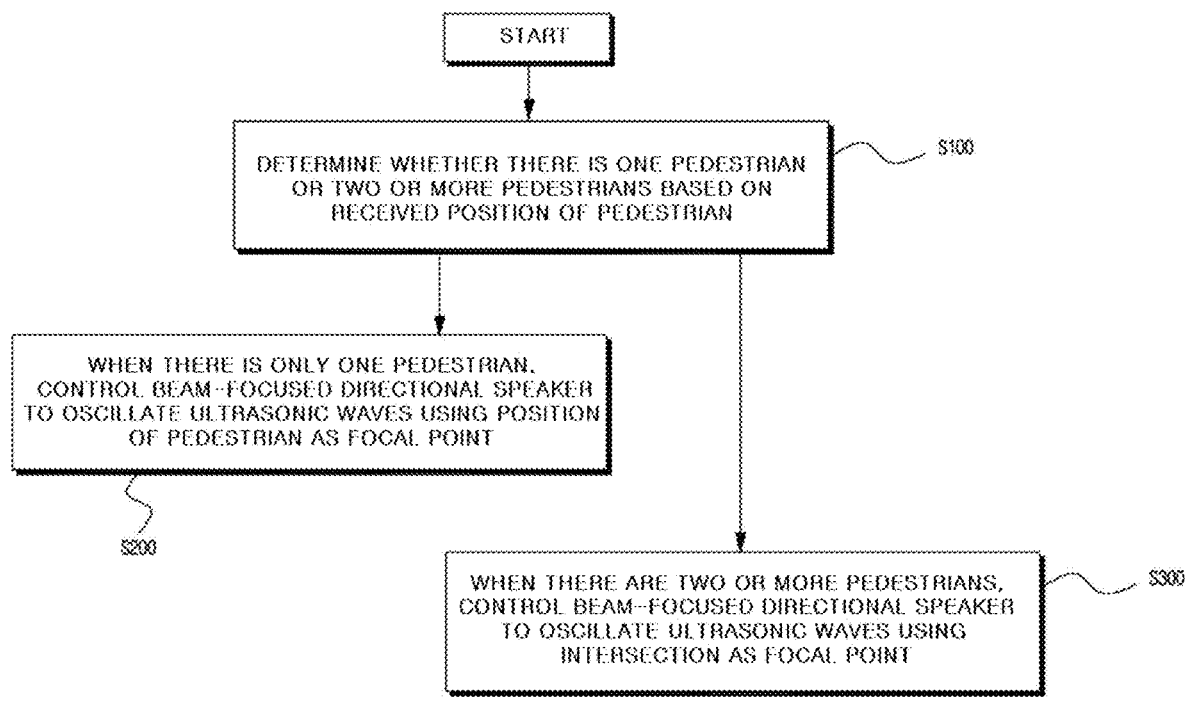
FIG. 7 is a flowchart illustrating a control process of a virtual sound output system according to an embodiment of the present invention.

FIG. 7 is a flowchart illustrating a control process of a virtual sound output system according to an embodiment of the present invention.

Referring to the drawing, a control method of a virtual sound output system for communication with a pedestrian according to an embodiment of the present invention includes determining, by the controller 200, whether there is one pedestrian or there are two or more pedestrians based on a received pedestrian position (S100); when there is only one pedestrian in operation S100, controlling the beam-focused directional speaker 100 to emit ultrasonic waves using the position of the pedestrian as a focal point F (S200); and when there are two or more pedestrians in operation S100, controlling the beam-focused directional speaker 100 to emit ultrasonic waves using an intersection calculated by the virtual sound output system 1000 described above, as a focal point F (S300).

Here, in operation S100, since the focal point and the emission delay time are calculated to be different depending on whether there is one pedestrian or there are a plurality of pedestrians, the controller 200 determines the number of pedestrians first.

As described above, operation S200 corresponds to a case in which there is one pedestrian, and in this case, the controller 200 controls the beam-focused directional speaker 100 to emit ultrasonic waves by specifying position coordinates of the pedestrian received from the sensor unit 300 as a focal point.

In addition, as described above, operation S300 corresponds to a case in which there are a plurality of pedestrians. In this case, the focal point F is calculated and the emission delay time d is calculated for each ultrasonic transducer 110, and the controller 200 controls the beam-focused directional speaker 100 so that ultrasonic waves are emitted to the focal point based on the corresponding delay time.

Detailed description thereof is given above in the virtual sound output system 1000 described above, and thus, is omitted here.

According to the present invention, virtual sound may be generated at a short-distance focal point in a situation in which there are a plurality of pedestrians using the beam-focused directional speaker, so that sound may be transmitted to a plurality of pedestrians.

In addition, since sound is transmitted only to pedestrians in a region of interest (ROI), verbal communication may be performed between autonomous vehicles and pedestrians without deterioration of environmental noise, and even in autonomous driving situations with many pedestrians in a downtown area, interaction may be effectively made with pedestrians without discomfort.

Although the embodiments of the present invention have been described above, the present invention is not limited to the specific embodiments described above. That is, those skilled in the art to which the present invention pertains may make many changes and modifications to the present invention without departing from the spirit and scope of the appended claims, and all such appropriate changes and modifications should be regarded as falling within the scope of this invention as equivalents.

DETAILED DESCRIPTION OF MAIN ELEMENTS

100: beam-focused directional speaker
110: ultrasonic transducer
200: controller
300: sensor unit
1000: virtual sound output system
F: focal point

What is claimed is:

1. A virtual sound output system for communication with a pedestrian, comprising:
    a beam-focused directional speaker including a plurality of ultrasonic transducers configured to emit a plurality of ultrasonic waves, respectively, to a focal point; and
    a controller configured to calculate a position of the focal point based on a position of the pedestrian and control the beam-focused directional speaker to emit the ultrasonic waves to the calculated focal point,
    wherein the controller is further configured to control the plurality of ultrasonic transducers to respectively emit the ultrasonic waves with a time difference such that the ultrasonic waves emitted from the plurality of ultrasonic transducers reach the focal point simultaneously.

2. The virtual sound output system of claim 1, wherein the controller is configured, in response to determining that there is only one pedestrian based on the position of the pedestrian, to calculate the position of the focal point within a predetermined range from the position of the pedestrian.

3. The virtual sound output system of claim 1, wherein the controller is configured, in response to determining that there is a plurality of pedestrians based on the position of the pedestrian, to perform:
    calculating (1) positions of left and right outermost pedestrians of the plurality of pedestrians positioned in front of the plurality of ultrasonic transducers and (2) positions of left and right outermost ultrasonic transducers of the plurality of ultrasonic transducers; and
    setting the location the focal point at an intersection between (1) a first straight line between the calculated position of the left outermost pedestrian and the calculated position of the right outermost ultrasonic transducer and (2) a second straight line between the calculated position of the right and left outermost pedestrian and the calculated position of the left outermost ultrasonic transducer.

4. The virtual sound output system of claim 3, wherein the controller is configured, when the positions of the left and right outermost pedestrians are respectively (xl, zl) and (xr, zr), and the positions of the left and right outermost ultrasonic transducers are respectively (xa, 0) and (−xa, 0), (x, y), to calculate the position of the intersection according to:

$$\begin{bmatrix} x \\ y \end{bmatrix} = \begin{bmatrix} \dfrac{-z_l x_a}{x_l - x_a} \\ \dfrac{z_r x_a}{x_r + x_a} \end{bmatrix} \cdot \begin{bmatrix} \dfrac{-z_l}{x_l - x_a} & 1 \\ \dfrac{-z_r}{x_r + x_a} & 1 \end{bmatrix}^{-1}.$$

5. The virtual sound output system of claim 2, wherein the controller is configured, when a number of the plurality of ultrasonic transducers is defined as N, to:
    calculate a distance r between the focal point and each of the ultrasonic transducers based on positions of the N number of ultrasonic transducers and the calculated position of the focal point;

calculate an emission delay time d of each ultrasonic transducer for the ultrasonic waves emitted from the ultrasonic transducers to simultaneously reach the focal point; and control each ultrasonic transducer to emit the ultrasonic wave.

6. The virtual sound output system of claim 5, wherein the controller is configured, when the position of the focal point is (xf, yf, zf), to calculate an emission delay time di of an i-th ultrasonic transducer of the N number of the ultrasonic transducers according to:

$$d_i = \frac{\max_{0 \le j \le N-1} r_j - r_i}{c}$$

wherein c is a speed of ultrasonic waves and $$r_i = \sqrt{(x_f - x_i)^2 + (y_f - y_i)^2 + (z_f - z_i)^2}$$
$$r_j = \sqrt{(x_f - x_j)^2 + (y_f - y_j)^2 + (z_f - z_j)^2}.$$

7. The virtual sound output system of claim 6, wherein the controller is configured, when a sound function to be transmitted to the pedestrian by controlling the beam-focused directional speaker is defined as g(t), to calculate an output signal function p(t) of the beam-focused directional speaker according to:

$$p(t) = P_0 \sqrt{1 + m \int g(t) dt^2} \cdot \sin 2\pi f_0 t$$

wherein t is a time, $f_0$ is an ultrasonic frequency, and $P_0$ and m are constants.

8. The virtual sound output system of claim 7, wherein the controller is configured to calculate an output signal function $p_i(t)$ of the i-th ultrasonic transducer of the N number of the ultrasonic transducers according to:

$$p_i(t) = p(t - d_i)$$

9. A method of controlling a virtual sound output system for communication with a pedestrian, the virtual sound output system including a beam-focused directional speaker including a plurality of ultrasonic transducers configured to emit a plurality of ultrasonic waves, respectively, to a focal point, the method comprising:

determining, based on a position of the pedestrian, whether there is a plurality of pedestrians; and in response to determining that there is a plurality of pedestrians, performing:

calculating (1) positions of left and right outermost pedestrians of the plurality of pedestrians positioned in a forward direction of the plurality of ultrasonic transducers and (2) positions of left and right outermost ultrasonic transducers of the plurality of ultrasonic transducers;

setting the location of the focal point at an intersection between (1) a first straight line between the calculated position of the left outermost pedestrian and the calculated position of the right outermost ultrasonic transducer and (2) a second straight line between the calculated position of the right and left outermost pedestrian and the calculated position of the left outermost ultrasonic transducer; and controlling the beam-focused directional speaker to emit the ultrasonic waves toward the focal point.

10. The control method of claim 9, wherein, when a number of the plurality of ultrasonic transducers is defined as N, the method further comprises:

calculating a distance r between the focal point and each ultrasonic transducer based on positions of the N number of ultrasonic transducers and the calculated position of the focal point;

calculating an emission delay time d of each ultrasonic transducer for the ultrasonic waves emitted respectively from the ultrasonic transducers to simultaneously reach the focal point; and controlling each ultrasonic transducer to emit its ultrasonic wave based on the emission delay time corresponding to each ultrasonic transducer.

\* \* \* \* \*